March 4, 1947.  E. M. FRY  2,416,687
MAGNETIC FOCUSSING DEVICE
Filed March 30, 1944  4 Sheets-Sheet 1

INVENTOR
E. M. FRY
BY
Walter C. Kiesel
ATTORNEY

March 4, 1947.  E. M. FRY  2,416,687
MAGNETIC FOCUSSING DEVICE
Filed March 30, 1944  4 Sheets-Sheet 2

INVENTOR
E. M. FRY
BY
Walter C. Kiesel
ATTORNEY

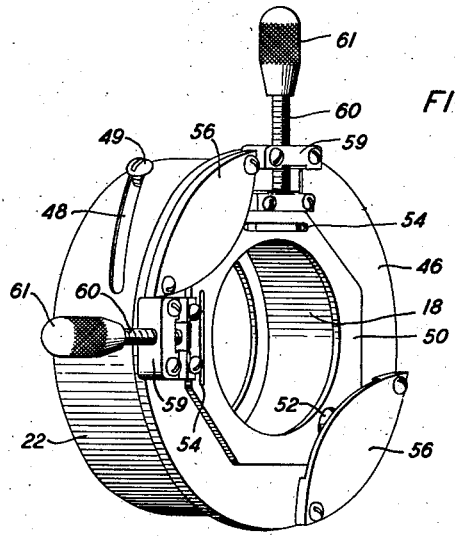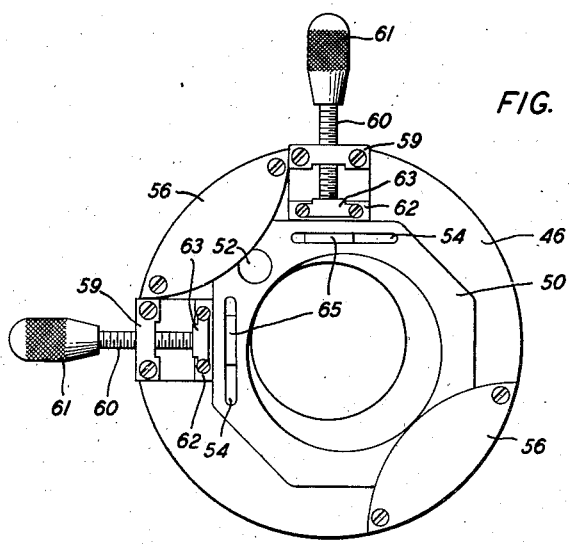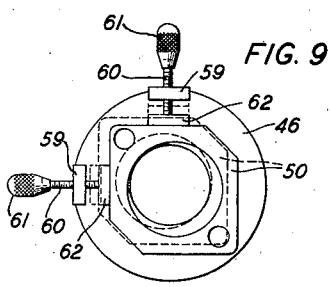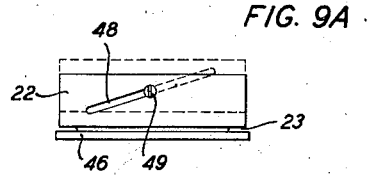

March 4, 1947. E. M. FRY 2,416,687
MAGNETIC FOCUSSING DEVICE
Filed March 30, 1944 4 Sheets-Sheet 4

INVENTOR
E. M. FRY
BY
Walter C. Kiesel
ATTORNEY

Patented Mar. 4, 1947

2,416,687

UNITED STATES PATENT OFFICE 2,416,687

MAGNETIC FOCUSSING DEVICE

Eugene M. Fry, Matawan, N. J., assignor to Bell Telephone Laboratories, Incorporated, New York, N. Y., a corporation of New York Application March 30, 1944, Serial No. 528,697

19 Claims. (Cl. 250—161)

This invention relates to magnetic focussing devices and more particularly to such devices employed in focussing the electronic beam in cathode ray oscillograph devices.

In the practical operation of cathode-ray oscillograph devices, a beam of electrons is projected from a source positioned at a considerable distance from a fluorescent screen on which the beam impinges in order that a wide sweep or deflection control may be obtained. In addition to the deflection control which may be magnetic or electrostatic, it is necessary to focus the beam of electrons to secure sharp definition on the screen and to center the beam to compensate for external magnetic fields and various manufacturing inequalities in the mounting and concentricity of the source with respect to the axis of the device. These corrective functions have been attained by electromagnetic coils in the past, which, however, are rather bulky and require separate power sources. Furthermore, the ampere turns of such coils was limited and temperature changes seriously affect the magnetic field strength. Another disadvantage is that defocussing of the beam also decenters the spot, since the beam follows a spiral path and a change in the focussing field alters the pitch of the spiral in which the electrons travel. This interaction causes numerous adjustments to be made during the warm-up period of the cathode-ray tube and under varying temperature levels of operating conditions, such as at ground level and at high altitudes.

Moreover, a separate direct current source of sufficient wattage is required for these coils which is not always convenient on account of the increased weight of equipment, for example, in an airplane where space is limited. Many of these difficulties are avoided in the focussing of the beam by the employment of a permanent magnet structure of small mass and concentrated magnetic flux pattern, such as an aluminum alloy magnet, although mounting and adjusting difficulties are still evident to adapt the permanent magnet to the cooperative functions with respect to the device to influence constant definition and concentricity of the beam over a range of accelerating voltages of large magnitude.

The primary objects of this invention are to increase the operating range and to improve the focussing characteristics of the magnet for use with cathode-ray oscillograph devices.

A specific object of the invention is to facilitate the manipulation of the components of the magnet to secure efficient operation in the focussing and centering of the electron beam in cathode-ray devices.

Another object of the invention is to improve the flux field of the magnet whereby a large range of anode or accelerating voltages may be utilized to accomplish sharp definition of the beam on the screen of the device.

A further object of the invention is to efficiently control the centering of the beam over a wide radius of the screen to overcome diverse alignment of the electron source with respect to the axis of the device and the center of an indicator scale superimposed on the screen of the device.

A further object of the invention is to facilitate the remote control of the flux field of the magnet mounted around the device so that adjustment may be accomplished without disturbing the device and the magnet structure usually enclosed in a protective casing.

These objects and advantages are obtained in accordance with this invention by employing an alloy ring of high magnetic flux density as the main component of the focussing magnet structure and surrounding the ring with an adjustable shunt member which may be reciprocally movable with respect to the pole-pieces of the ring to vary the strength of the magnetic field up to 200 gausses. An annular auxiliary plate on one end of the magnetic structure is adjustably movable in transverse directions to distort the field and influence the directional flow of the electron beam in the device whereby contralization of the beam with respect to the axial line of the screen is produced in a facile manner. This construction forms a unitary assembly which may be mounted on the neck of the cathode-ray tube and the controls extended by flexible cables to a front panel adjacent the viewing scale of the device.

The specific assembly of the unitary structure involves a shunt member controlled reciprocally by a chain drive coupled to a plurality of screw members extending through the shunt and located between the shunt and magnet proper. Another form involves a rotatable sleeve having arcuate slots therein with adjustable means in the slots to vary the relationship of the shunt with respect to the magnet pole-pieces.

The specific construction of the centering component of the structure involves movement of an annular plate on one end of the magnet assembly by cam shafts operating against tensioned springs disposed in opposite relation to the cams to shift the plate transversely with respect to the axis of the magnet structure. In a modified arrangement of this feature of the invention, the plate is controlled by radial shafts having extensions thereon located in transverse slots in the plate to shift the plate with respect to the axis of the magnet structure.

These and other features of the invention are best understood by referring to the following detailed description and the accompanying drawings.

Fig. 6 is a perspective view of a modified form of the invention having a slotted sleeve for adjusting the shunt and a slotted ring plate adjustable by radial screws;

Fig. 7 is a rear plan view of the magnet structure shown in Fig. 6;

Figs. 9 and 9a are diagrammatic views of the same magnet assembly with one of the two extreme positions of the centering ring and shunt shown in dotted line, respectively.

Figure 1:
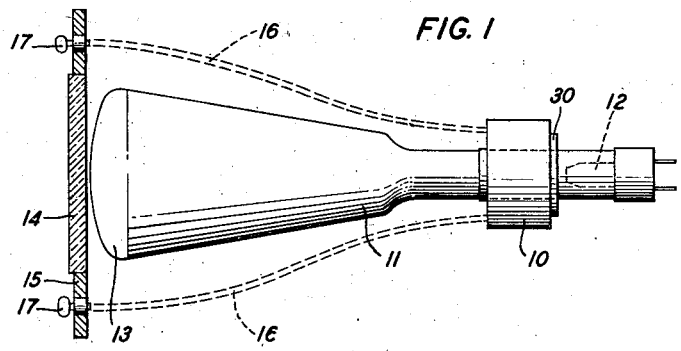
Fig. 1 illustrates in a general side view the application of the magnet structure of this invention to the neck of a cathode-ray device having a fluorescent screen adjacent a viewing plate on a panel and the controls mounted on the panel for adjusting the focussing and centering components of the magnet structure.

Referring to Fig. 1 of the drawing, the magnetic focussing and centering device 10 of this invention is mounted on the neck of a cathode-ray tube or device 11 having an electron gun 12 at one end thereof disposed to the rear of the magnetic focussing device and adapted to produce a narrow beam of electrons which is projected to a fluorescent screen 13 on the opposite end of the cathode-ray device. The electron beam is magnetically focussed to produce sharp definition of the spot arriving at the screen and the beam is radially shifted by the centering plate to correct external magnetic fields and manufacturing inaccuracies in the mounting of the gun 12 with respect to the axial line of the screen 13 of the device. The tube 11 is mounted behind a transparent viewing plate 14 with the screen 13 adjacent thereto and the plate is mounted in an opening of a panel 15 of a casing enclosing the tube and other cooperating apparatus. Since the permanent magnet focussing device 10 is rigidly mounted about the neck of the tube, remote from the front panel of the casing, convenient adjustment of the elements of the focussing device is accomplished by flexible cables 16 coupled to the permanent magnet device and extending through openings in the front panel 15. These cables are connected to knobs 17, to facilitate manipulation of the control for varying the flux distribution of the focussing magnet structure and for adjusting the position of the beam projected to the screen of the tube and the viewing plate 14.

Figure 2:
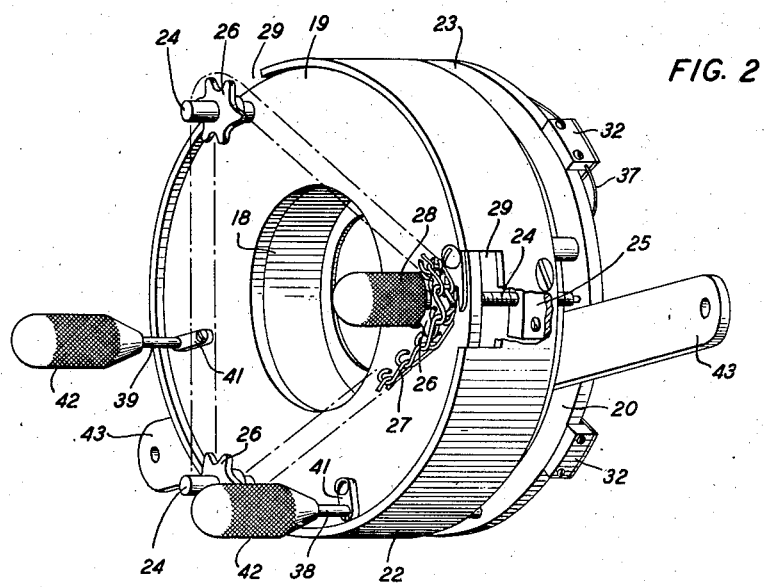
Fig. 2 is a perspective view of one embodiment of the invention utilizing the chain drive for the movement of the shunt and collateral shafts for the movement of the centering plate member on the rear of the magnet with a portion of the shunt member broken away to show the connection of one of the travel blocks to the vertical lead screw.
Figure 3:
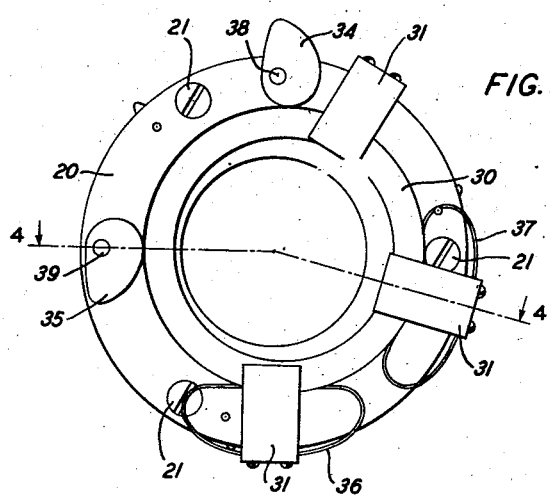
Fig. 3 is a rear plan view of the magnet structure shown in Fig. 2 and illustrates the relation of the centering element with respect to the magnet, operating cams and spring members.
Figure 4:
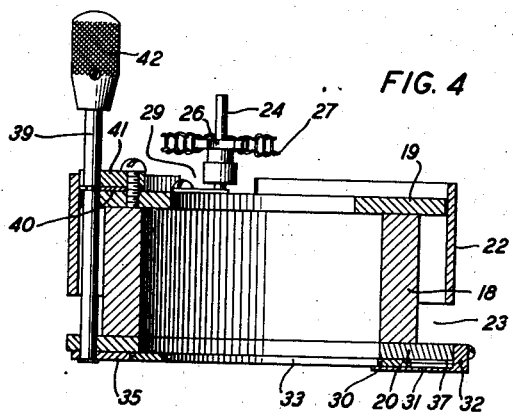
Fig. 4 shows in cross section the details of the magnet structure taken on the line 4—4 of Fig. 3.

One embodiment of the focussing and centering magnetic structure of this invention is shown in Figs. 2 to 4, inclusive, and comprises a cylindrical core member 18 of magnetic material having high flux density and magnetic retentivity. The magnetic properties are highly resistant to change by stray fields, vibration, or temperature and such properties are characteristic of magnetic alloys of the iron-nickel-aluminum type. A particularly desirable magnetic alloy of this type is "Alnico No. 2" having a composition of 17 per cent nickel, 11 per cent aluminum, 12 per cent cobalt, 6 per cent copper and the balance iron. The permanent magnet core forms the main component of the device for focussing of the beam of the cathode-ray tube and its magnetic properties are substantially constant over a considerable period of operation due to its stable characteristics and concentrated flux field, for instance, the magnetism of such an alloy does not change more than 2 per cent over a temperature range from —40 to 1,000° F. and the fatigue loss due to stray fields and vibrations is extremely low. The core member is clamped between a top ring pole-piece 19 and a bottom ring pole-piece 20 which has a slightly larger diameter than the top pole-piece, the two pole-pieces being secured together by screws 21 extending therebetween exterior to the core member.

Figure 5:
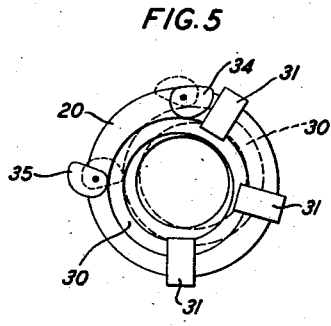
Figs. 5 and 5a are diagrammatic views of the magnet structure illustrating in dotted line the alternate positions of the centering element and shunt, respectively, with respect to their oppositely shifted positions.
Figure 5A:
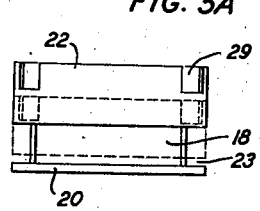

In order to adapt the focussing device to the focussing of the beam in a cathode-ray tube over a large range of operating voltages and to vary the flux distribution of the permanent magnet structure, a cylindrical sleeve or ring shunt member 22 of magnetic material, such as steel, is mounted exteriorly to the core member 18 and coaxial therewith and is reciprocally movable in an axial direction to vary the gap 23 between the lower end of the sleeve and the bottom pole-piece 20. The cylindrical shunt is slidably actuated by a plurality of equally spaced lead screw members or spindles 24 which extend through the top pole-piece 19 and are seated in the bottom pole-piece intermediate the magnet core 18 and the shunt 22. These lead screws engage follower blocks 25 rigidly secured to the inner surface of the shunt ring 22 so that rotation of the lead screws in the blocks causes the shunt ring to be reciprocally movable with respect to the bottom pole-piece 20, as shown in Fig. 5a, to vary the flux density of the gap 23 and thereby increase or decrease the strength of the magnetizing force influencing the beam of electrons in the cathode-ray tube over an operating range of anode voltages from 3,000 to 7,000 volts. Each rotatable spindle is provided with a pinion gear 26 and the three spindles are rotated simultaneously by a chain drive 27. The driving spindle 24, as shown in Fig. 2, is provided with a knurled knob 28 for manual operation and the remaining spindles are driven simultaneously by the chain drive 27 to slidably control the spacial relation of the shunt sleeve with respect to the magnet structure. It is, of course, understood that the knob 28 may be removed and a flexible cable 16 coupled to the drive spindle to accomplish the reciprocal movement of the shunt with respect to the magnet structure. The shunt sleeve is also provided with a plurality of rectangular cut-out portions 29 to permit the sleeve to clear the pinion gears 26 on the spindles.

In addition to the adjustable shunt to control the focussing of the electron beam, the directive flow of the beam is also controlled to compensate for eccentricities in the mounting of the gun 12 in the device with respect to the axial line of the tube towards the screen 13. This is accomplished by an auxiliary magnetic member or ring 30 mounted in axial and abutting relation on the rear of the bottom pole-piece 20. The centering ring 30 is held in position on the rear pole-piece by a plurality of retainer plates 31 which are mounted on spacer blocks 32 attached to the periphery of the bottom pole-piece and permit the centering ring to slidably move across the bottom pole-piece so that the large diameter opening 33 of the centering ring is eccentrically controlled with respect to the larger diameter opening in the bottom pole-piece. The adjustment of the centering ring 30 is controlled by a pair of cam members 34 and 35, shown in Fig. 3, which are mounted on the bottom pole-piece in the same plane as the centering ring, the cam member 34 being mounted adjacent the periphery of the pole-piece in opposed relation to the retainer plate 31, as shown in Fig. 3, and the cam member 35 being mounted in similar relation but displaced 90 degrees in a counter-clockwise direction.

The movement of cam 34 slidably shifts the centering ring 30 diametrically transverse to the axis of the magnet structure and the movement of cam 35 shifts the ring perpendicular to the movement of the ring by cam 34, the cam surfaces contacting the periphery of the ring 30 and regulating the movement thereof by the rotation of the cams. The force exerted on the centering ring 30 by cam 34 is counteracted by a repulsion loop spring 36 having its ends mounted in the block 32 and the loop portion engaging a groove in the periphery of the centering ring 30. A similar lop spring 37 counteracts the force of the cam 35 and is mounted in opposed relation thereto adjacent the periphery of the centering ring. The cam members 34 and 35 are controlled by rotatable shafts 38 and 39 which project through the pole-pieces intermediate the core member 18 and the shunt sleeve 22 and are prevented from longitudinal movement by a bifurcated leaf spring 40 engaging a circular slot on the shaft, as shown in Fig. 4, the leaf spring being held in position by a retainer block 41 secured to the top pole-piece, the block also preventing turning of the shafts. The cam shafts are individually rotatable by a knurled knob 42, as shown in Figs. 2 and 4, although these controls may be remotely operated by flexible shafts 16, as shown in Fig. 1. The adjustable magnet structure of this invention may be mounted in rigid position around the neck of the cathode ray tube by suitable radial arms 43 extending from the bottom pole-piece, as shown in Fig. 2.

Figure 8:
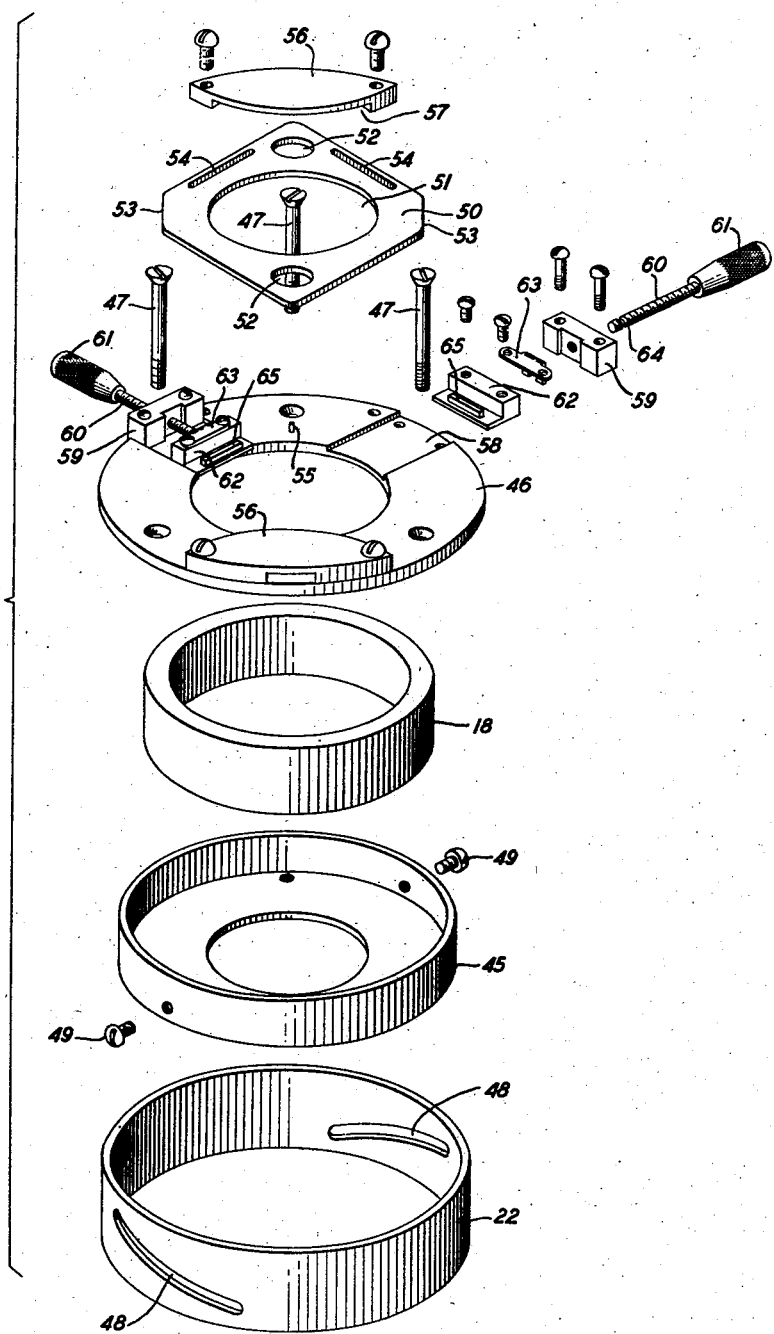
Fig. 8 illustrates in a perspective exploded view the components of the magnet assembly of Figs. 6 and 7.

A modified form of the invention is shown in Figs. 6 to 8, inclusive, in which the shunt sleeve is adjusted with respect to the bottom pole-piece by manual rotation of the sleeve with respect to the magnet structure and the centering member is movable in transverse directions perpendicular to the axis of the magnet structure by reciprocal controls extending radially from the bottom pole-piece. The construction of this embodiment of the invention may be more clearly understood from Fig. 8 which shows the elemental parts of the structure in exploded fashion with the related components in superimposed relation, the composite assembly being shown in Figs. 6 and 7. In this form of the invention, the permanent magnet core member 18 is clamped between a cup-shaped ring pole-piece 45 and a larger diameter flat ring pole-piece 46 by bolts 47 which extend through the pole-pieces on the exterior of the core member 18. The shunt ring 22 surrounds the pole-piece 45 and magnet core and is provided with a pair of oppositely disposed angularly directed slots 48, through which extend screws 49 secured in the cup-shaped pole-piece 45, the shunt sleeve being adjustably movable with respect to the bottom pole-piece by the rotation of the sleeve coaxially with respect to the rigidly mounted pole-piece 45, the loosened screws 49 in the slots and the pole-piece permitting rotation of the sleeve and tightening of the screws 49 maintaining the proper adjustment of the sleeve with respect to the magnet structure, as shown in Fig. 9a.

The auxiliary centering member magnet on the rear of the bottom pole-piece is formed of a rectangular plate 50 having an enlarged central opening 51 and two opposed smaller diameter openings 52 at diagonally related corners of the plate and the remaining corners being cut-off, as shown at 53. The centering plate is also provided with a pair of elongated slots 54 arranged in perpendicular relation to each other intermediate the central opening 51 and the edges of the plate on opposite sides of one of the corner openings 52. The centering plate 50 is mounted in abutting relation to the bottom pole-piece 46 on the rear surface thereof and limit pins 55, one of which is shown in Fig. 8, project from the rear surface of the bottom pole-piece. These pins are located in the apertures 52 of the centering plate when placed in position on the pole-piece. The limit pins and the centering plate are subsequently covered by retainer plates 56 of segmental form having a V-shaped recess 57 on the under surface thereof to permit slidable movement of the centering plate 50 with respect to the bottom pole-piece 46 but preventing movement away from the pole-piece 46, the retainer plates being rigidly secured to the bottom pole-piece. The bottom pole-piece 46 is provided with a pair of rectangular recesses 57 adjacent to the slots 54 in the magnet plate 50 and a rigidly mounted guide block 59 is secured in the recess adjacent the periphery of the pole-piece to receive a radially directed lead screw 60 having a knurled knob 61 on the outer end thereof. The lead screw is reciprocally movable in the rigidly mounted guide block 59 and engages a follower block 62 slidably movable in the recess 58 of the pole-piece, the lead screw being retained in the follower block by an angle plate 63 which engages a slot 64 on the lead screw. The follower block 62 is provided with an extension 65 with a raised bar projection 66, the bar 66 forming a slidable shoe extending into the slot 54 of the centering plate 50 so that reciprocal movement of one of the lead screws adjusts the position of the centering plate 50 with respect to the axis of the magnet structure across one diameter of the pole-piece while the shoe in the other slot slides longitudinally therein. When the centering plate 50 is adjusted transversely to the other extreme, as shown in Fig. 9, the previously slidable shoe is now stationary in the slot while the other shoe is slidable in its respective slot.

The focussing and centering magnetic structure of this invention, together with the adjustable controls produce an accurate control of the field strength of the focussing flux of the permanent magnet over a range of anode voltages from 3,000 to 7,000 volts. The centering control of the beam is effective to accurately position a spot on the screen of the tube within a circle of one and one-half inches in diameter on a five inch screen. Furthermore, these constructions facilitate the mounting of the focussing structure in a compact manner around the neck of the tube and enable the controls of the adjustable components of the focussing device to be accomplished in a facile manner and with a minimum of lost motion. The centering controls also permit fine adjustment of the centering plate on the rear of the magnet structure to compensate for minute irregularities in the mounting of the gun, whereby positioning of the beam with respect to the axis of the tube is obtained.

While the specific structures of this invention, as herein disclosed, relate to particular manipulative controls with respect to the adjustments of the shunt sleeve and centering plate of the devices, it is, of course, understood that various modifications may be made therein without departing from the scope of the invention as defined in the appended claims.

What is claimed is:

1. In combination, a cathode-ray device including means to develop a beam of electrons and a fluorescent screen on which said beam impinges and a magnetic structure surrounding said device for focussing and centering said beam on said screen comprising an annular core member of high magnetic flux density, a metallic shunt sleeve surrounding said core member, means for adjusting said sleeve with respect to said core member to vary the flux distribution, an annular metallic plate supported on one end of said core member, and means adjacent said core member engaging said plate for transversely moving it whereby the axis of said plate is laterally displaced with respect to the axis of said core member.

2. In combination, a cathode-ray tube having a screen on one end and an electron gun at the other end for projecting a beam toward said screen, and a beam focussing and centering magnetic structure surrounding said tube between said screen and gun comprising an annular permanent magnet, a metallic shunt sleeve coaxial with said magnet, means for reciprocally adjusting said sleeve with respect to said magnet in an axial direction, an annular metallic plate adjacent said magnet, and cam operated means for transversely adjusting said plate perpendicular to the axis of said magnet and tube to initially shift said beam on said screen to a centering point thereon.

3. In combination, a cathode-ray device including means for developing a beam of electrons and a target screen impinged by said beam and a magnetic structure surrounding said device for focussing and center said beam on said screen comprising an annular core member of high magnetic flux density, ring pole-pieces on opposite ends of said core member, a metallic shunt sleeve coaxial with said core member, means for adjusting said sleeve with respect to said pole-pieces to vary the flux distribution, an annular metallic plate supported by one of said pole-pieces, and means carried by said supporting pole-piece engaging said plate for transverse movement thereof whereby the axis of said plate is laterally displaced with respect to the axis of said core member.

4. In combination, a cathode-ray tube including means to develop a beam of electrons and a fluorescent screen on which said beam impinges and a magnetic structure surrounding said tube for focussing and centering said beam on said screen comprising an annular core member of high magnetic flux density, ring pole-pieces on opposite ends of said core member, a metallic shunt sleeve surrounding said core member, means for adjusting said sleeve with respect to said pole-pieces to vary the flux distribution, an annular metallic plate supported by one of said pole-pieces, and cam-operated means on said supporting pole-piece for displacing said plate with respect to the axis of said supporting pole-piece.

5. In combination, a cathode-ray tube including means to develop a beam of electrons and a fluorescent screen on which said beam impinges, and a magnetic structure surrounding said tube for focussing and centering said beam on said screen comprising an annular magnetic member having pole-pieces at opposite ends, a shunt ring surrounding said member, means for slidably adjusting said ring with respect to said pole-pieces, a separate centering ring of magnetic material on one end of said member and coaxial therewith, and adjustable means for moving said centering ring in two transverse directions at right angles to each other with respect to the axis of said magnetic member.

6. In combination, a cathode-ray tube including means to develop a beam of electrons and a fluorescent screen toward which said beam is directed, and a magnetic structure surrounding said tube for focussing and definitely positioning the spot of said beam on said screen comprising an annular core member of high magnetic flux density, ring pole-pieces attached to opposite ends of said core member, a cylindrical metallic shunt coaxial with said core member, adjustable means engaging said shunt for reciprocal movement thereof with respect to said pole-pieces to vary the flux distribution, an annular auxiliary disc member of magnetic material adjacent one of said pole-pieces and slidably movable in directions perpendicular to the axis of said pole-piece, cams disposed in the plane of said disc member, said cams being adapted to alter the position of said disc member eccentrically with respect to said pole-piece, and rotatable shafts extending through said pole-pieces and secured to said cams.

7. In combination, a cathode-ray tube including means to develop a beam of electrons and a fluorescent screen toward which the beam is directed, and a permnent magnet structure surrounding said tube for focussing and shifting said beam to a definite spot on said screen comprising an annular core member of high magnetic flux density, ring pole-pieces attached to opposite ends of said core member, a cylindrical metallic shunt coaxial with said core member, adjustable means engaging said shunt for reciprocal movement thereof with respect to said pole-pieces to vary the flux distribution, an annular auxiliary disc member of magnetic material adjacent one of said pole-pieces and slidably movable in directions perpendicular to the axis of said pole-piece, cams disposed in the plane of said disc member, said cams being adapted to alter the position of said disc member eccentrically with respect to said pole-piece, rotatable shafts extending through said pole-pieces and secured to said cams, and cushion spring members disposed on said pole-piece to counteract displacement of said disc member.

8. In combination, a cathode-ray tube including means to develop a beam of electrons and a fluorescent screen on which the beam impinges, and a permanent magnet structure surrounding said tube for focussing and centering the beam spot on said screen comprising an annular core member of high magnetic flux density, ring pole-pieces attached to opposite ends of said core member, a cylindrical metallic shunt coaxial with said core member, adjustable means engaging said shunt for reciprocal movement thereof with respect to said pole-pieces to vary the flux distribution, an annular auxiliary disc member of magnetic material adjacent one of said pole-pieces and slidably movable in directions perpendicular to the axis of said pole-piece, cams disposed in the plane of said disc member, said cams being adapted to alter the position of said disc member eccentrically with respect to said pole-piece, cushion spring members disposed on said pole-piece to counteract displacement of said disc member, and retainer means supporting said disc member on said pole-piece.

9. In combination, a cathode-ray tube including means to develop an electron beam and a fluorescent screen excited by said beam to form a spot thereon, and an electron beam focussing and centering device surrounding said tube comprising a pair of aligned ring pole-pieces, a cylindrical permanent magnet core coaxially clamped between said pole-pieces, a shunt member having spaced projecting blocks on the inner surface encircling said core, rotatable members extending through said pole-pieces and engaging said blocks for reciprocal movement of said shunt member with respect to said core, pinions on one end of said rotatable members, and a chain drive engaging said pinions to actuate said rotatable members simultaneously.

10. An electron beam focussing and centering device for a cathode-ray tube having a target screen receptive to the beam comprising top and bottom ring pole-pieces, a cylindrical permanent magnet core coaxially clamped between said pole-pieces, an auxiliary ring slidably movable across the rear surface of the bottom pole-piece, a pair of retainer plates attached to said bottom pole-piece extending over said ring, a pair of repulsion springs bearing against said plates and ring, and individually rotatable cam members in contact with the periphery of said ring in oppositely disposed relation to said springs.

11. In combination, a cathode-ray tube including means to develop a beam of electrons and a fluorescent screen impinged by said beam to form a spot thereon and a permanent magnet structure surrounding said tube for focussing and positioning the spot on said screen comprising an annular core member of high magnetic flux density, ring pole-pieces on opposite ends and clamping said core member therebetween, an auxiliary plate having a central opening mounted adjacent the outer surface of one of said pole-pieces, guide blocks attached to said pole-piece adjacent two sides of said plate, and reciprocal screw members extending through said blocks engaging said plate for slidable movement thereof in two transverse directions perpendicular to the axis of said pole-pieces and core member.

12. In combination, a cathode-ray tube including means to develop a beam of electrons and a fluorescent screen on which the beam impinges as a sharp spot, and a permanent magnet structure surrounding said tube for focussing and centering said beam on said screen comprising an annular core member of high magnetic flux density, ring pole-pieces on opposite ends and clamping said core member therebetween, an auxiliary plate having a central opening and a pair of elongated slots therein in transverse directions along the sides thereof, said plate being mounted adjacent the outer surface of one of said pole-pieces, slidable means held in said slots, and radial feed means engaging said slidable means to displace said plate reciprocally in two directions transverse to the axis of said core member.

13. In combination, a cathode-ray tube including an electron beam source and a fluorescent screen receptive to the beam to form a spot thereon, and a permanent magnet structure surrounding said tube for focussing and centering said beam on said screen comprising an annular core member of high magnetic flux density, ring pole-pieces clamping said core member therebetween, an auxiliary plate having a central opening therein, elongated slots in transverse directions along the sides thereof, slidable means held in said slots, rotatable feed members extending from said pole-piece in a radial direction and engaging said slidable means to displace said plate reciprocally in two directions transverse to the axis of said core member, and a metallic shunt sleeve coaxial with said core member rotatably movable with respect to said core member.

14. In combination, a cathode-ray tube including an electron beam source and a fluorescent screen receptive to the beam to form a spot thereon, and a permanent magnet structure surrounding said tube for focussing and centering said beam on said screen comprising an annular core member of high magnetic flux density, top and bottom pole-pieces clamping said core member therebetween, an auxiliary plate having a central opening therein and elongated slots in transverse directions along the sides thereof, said plate being mounted adjacent the outer surface of said bottom pole-piece, slidable means held in said slots, rotatable feed members supported on said bottom pole-piece and engaging said slidable means to displace said plate reciprocally in two directions transverse to the axis of said core member, a metallic shunt sleeve surrounding said core member, said sleeve having angularly directed slots therein, and locking means extending through said slots fastened to said top pole-piece.

15. In combination, a cathode-ray tube including means to develop a beam of electrons and a fluorescent screen on which the beam impinges, and a permanent magnet structure surrounding said tube for focussing and centering the beam on said screen comprising an annular core member of high magnetic flux density, top and bottom ring pole-pieces clamping said core member therebetween, an auxiliary plate having a central opening and elongated slots on two sides of each opening perpendicular to each other, said plate being in contact with said bottom pole-piece, retainer blocks having recesses therein extending over portions of said plate and being secured to said bottom pole-piece, guide blocks adjacent opposite ends of one of said retainer blocks and affixed to said bottom pole-piece in relation to said slots, threaded spindles extending through said guide blocks in transverse radial directions, and a shoe on each of said spindles having a portion within and slidably movable with respect to the elongated slots in said auxiliary plate.

16. In combination, a cathode-ray tube including means to develop a beam of electrons and a fluorescent screen on which the beam impinges and a permanent magnet structure surrounding said tube for focussing and centering said beam on said screen comprising an annular core member of high magnetic flux density, top and bottom ring pole-pieces clamping said core member therebetween, an auxiliary plate having a central opening and elongated slots on two sides of said opening perpendicular to each other, said plate being in contact with said bottom pole-piece, guide blocks affixed to said bottom pole-piece in relation to said slots, threaded members extending through said guide blocks in transverse radial directions, a shoe on each of said threaded members having a portion within and slidably movable with respect to said slots, and upright pins projecting from said bottom pole-piece for limiting the movement of said auxiliary plate with respect to the axis of the magnet structure.

17. In combination, a cathode-ray tube including means to develop a beam of electrons and a fluorescent screen on which the beam impinges, and a permanent magnet structure surrounding said tube for focussing and centering the beam on said screen comprising an annular core member of high magnetic flux density, top and bottom ring pole-pieces clamping said core member therebetween, an auxiliary plate having a central opening and elongated slots on two sides of said opening perpendicular to each other, said plate being in contact with said bottom pole-piece, retainer blocks having recesses therein extending over portions of said plate and being secured to said bottom pole-piece, guide blocks adjacent opposite ends of one of said retainer blocks and affixed to said bottom pole-piece in relation to said slots, threaded spindles extending through said guide blocks in transverse radial direction, a shoe on each of said spindles having a portion within and slidably movable with respect to said elongated slots, a metallic shunt sleeve surrounding said core member having oppositely disposed angular slots therein intermediate the edges thereof, and adjustable members extending through said slots and anchored in said top pole-piece.

18. In combination, a cathode-ray tube including means for developing a beam of electrons and a fluorescent screen on which the beam impinges and a permanent magnet structure surrounding said tube for focussing and centering the beam on said screen comprising an annular core member of high magnetic flux density, top and bottom ring pole-pieces clamping said core member therebetween, an auxiliary plate having a central opening and elongated slots on two sides of said opening perpendicular to each other, said plate being in contact with said bottom pole-piece, a rigid guide block adjacent each of said slots on said bottom pole-piece, a follower guide block having a shoe extension projecting into each of said slots, and a threaded spindle extending through said guide block in transverse radial direction and connected to said follower block.

19. In combination, a cathode-ray tube including means for developing a beam of electrons and a fluorescent screen on which the beam impinges and a permanent magnet structure surrounding said tube for focussing and centering said beam on said screen comprising an annular core member of high magnetic flux density, a cup-shaped top pole-piece on one end thereof, a bottom pole-piece having rectangular recesses therein on the other end thereof, said pole-pieces being clamped together with said core member therebetween, a slidable centering plate of rectangular configuration having a central opening of larger diameter than said core member and pole-pieces, a pair of apertures in opposite corners thereof and transverse elongated slots between said openings and the edges of said plate, limit pins projecting from said bottom pole-piece, a pair of apertured blocks rigidly mounted at the outer end of said recesses in said bottom pole-piece, a pair of slidable apertured blocks in said recesses adjacent said rigid blocks, each having a projection with a raised solid portion, radial screw members extending through said blocks, said plate being mounted in abutting relation to said bottom pole-piece to locate said pins within said apertures and said raised solid portions within said slots, and segmental cover plates secured to said bottom pole-piece and enclosing said limit pins, said centering plate being reciprocally movable with respect to said cover plates.

EUGENE M. FRY.

REFERENCES CITED

The following references are of record in the file of this patent:

UNITED STATES PATENTS

| Number | Name | Date |
|---|---|---|
| 2,336,837 | Bedford | Dec. 14, 1943 |
| 2,219,193 | Mynall | Oct. 22, 1940 |
| 2,224,933 | Schlesinger | Dec. 17, 1940 |

FOREIGN PATENTS

| Number | Country | Date |
|---|---|---|
| 472,165 | Britain | Mar. 11, 1936 |
| 523,439 | Britain | Jan. 3, 1939 |